United States Patent [19]

Stoll et al.

[11] 4,193,423
[45] Mar. 18, 1980

[54] MULTIWAY VALVE

[76] Inventors: Kurt Stoll, Lenzhalde 72, Esslingen; Gerhard Hihn, Schurwaldstrasse 7, Berkheim, both of Fed. Rep. of Germany

[21] Appl. No.: 913,099

[22] Filed: Jun. 6, 1978

Related U.S. Application Data

[63] Continuation of Ser. No. 744,271, Nov. 23, 1976, abandoned.

[30] Foreign Application Priority Data

Nov. 27, 1975 [DE] Fed. Rep. of Germany ....... 2553250

[51] Int. Cl.² .................. F16K 11/02; F16K 31/165; F16K 31/02
[52] U.S. Cl. ............................. 137/625.64; 251/130; 137/625.66; 137/625.5; 251/335 R
[58] Field of Search ............... 92/99; 251/130, 61.1, 251/61.2, 61.3, 625.6, 625.61; 137/625.64, 625.66, 625.27, 625.5

[56] References Cited

U.S. PATENT DOCUMENTS

| 2,547,098 | 4/1951 | Smith et al. ........................ 251/130 |
| 2,741,187 | 4/1956 | Moller ...................................... 92/99 |
| 3,188,148 | 6/1965 | Eaton ............................... 137/625.64 |
| 3,794,075 | 2/1974 | Stoll et al. ....................... 137/625.66 |

FOREIGN PATENT DOCUMENTS

| 1201141 | 9/1965 | Fed. Rep. of Germany ........... 251/335 |
| 2337007 | 2/1975 | Fed. Rep. of Germany ........ 137/625.5 |
| 2537347 | 3/1976 | Fed. Rep. of Germany ...... 137/625.27 |

Primary Examiner—Martin P. Schwadron
Assistant Examiner—A. Michael Chambers
Attorney, Agent, or Firm—Watson, Cole, Grindle & Watson

[57] ABSTRACT

A multiway valve which includes an axially positionable regulating member therein. The regulating member includes a diaphragm sealingly connected thereto which has a sealing lip extending radially therefrom which contacts the inner valve wall and an elastically deformable annular projection which is fixedly positioned in contact with the valve body which suspends the diaphragm within the central bore of the valve body. The diaphragm includes a surface engageable with a valve seat of the valve to contact fluid communication between tapped bores in the multiway valve.

14 Claims, 1 Drawing Figure

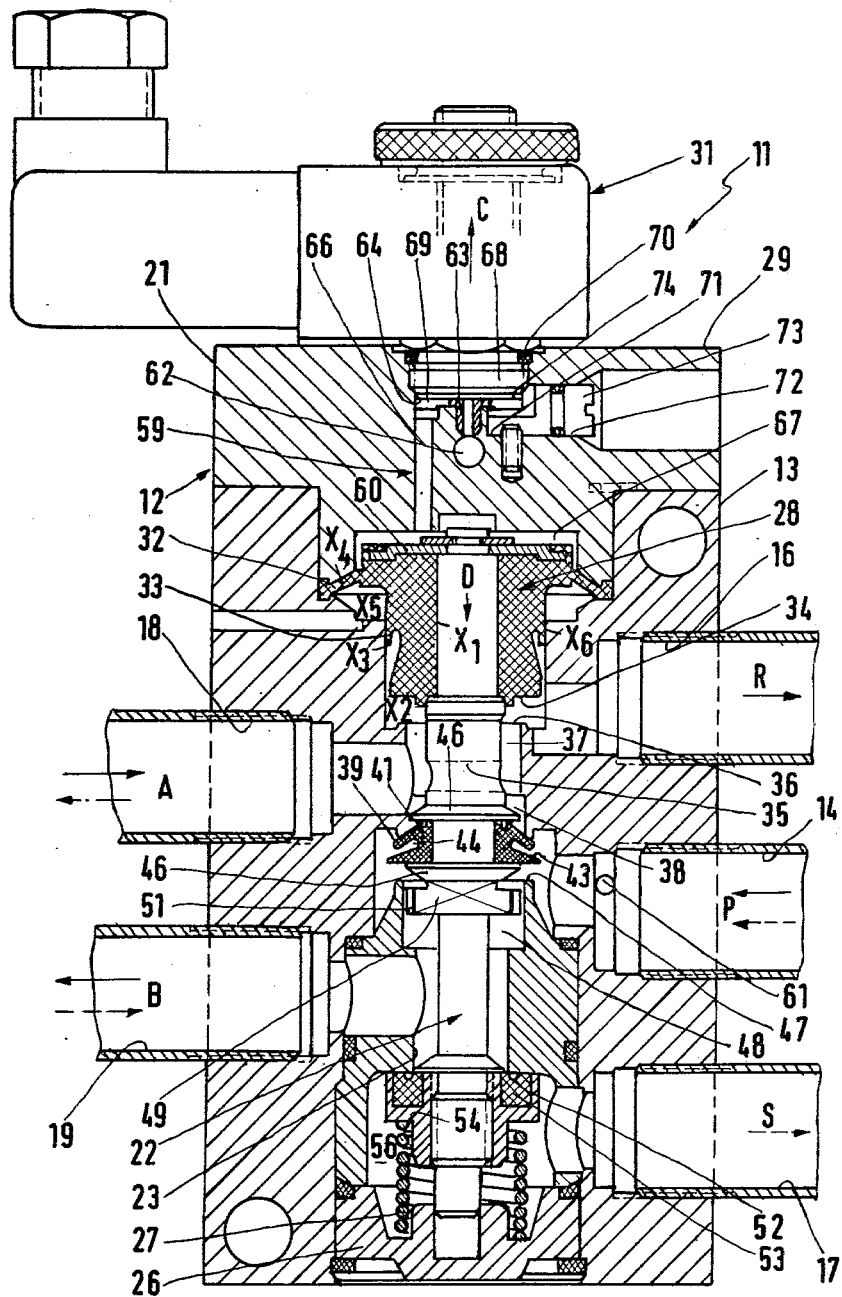

MULTIWAY VALVE

This is a continuation of application Ser. No. 744,271 filed Nov. 23, 1976, and now abandoned.

This invention is concerned with improvements in or relating to a multiway valve.

According to the present invention there is provided a multiway valve including a regulating member which is axially adjustable in a bore of a valve body and which mounts a diaphragm, the latter forming an internal seal where it engages against the regulating member, defining a seating area for sealing engagement with a valve seat, and a radially effective lip seal with the bore, and controlling movement of the regulating member.

Preferably, the valve includes a double-seat sealing member which is in the form of a ring gasket having a Vee-shaped groove around its outer periphery, the diameter of the root of the groove being smaller than the diameter of valve seats against which respective sealing lips of the ring gasket are axially elastically deformable on movement of the regulating member, the valve seats being integral with the valve body.

DESCRIPTION OF THE DRAWING

An embodiment of the present invention will now be described by way of example only with reference to the accompanying drawing, the single FIGURE of which shows an axial section through a multiway valve according to the present invention.

DETAILED DESCRIPTION OF THE PREFERRED EMBODIMENT

Referring to the drawing, a diaphragm-operated, multiway valve 11, which has an approximately rectangular cross-section, comprises a sectioned valve body 12 which comprises tapped bores 14, 16 and 17 in one of its narrow sides 13 to serve, respectively, as a pressure connection P and venting connections R and S, and tapped bores 18 and 19 in the opposite narrow side 21 which connect with two consumer units A and B. Depending on the position of an axially adjustable regulating member 22 inside a multi-stepped axial control bore 23 which extends centrally through the valve body 12, the pressure connection P may be connected with the consumer unit B as shown in the drawing, the consumer unit A being connected with the venting system R while the venting system S is closed; or the pressure connection P may be connected with the consumer unit A, the consumer unit B being connected with the venting system S, and the venting system R being closed.

The regulating member 22, one end of which is supported against a helical compression spring 27 in a plug 26 which isolates the control bore 23, is axially adjustable against the load of the spring 27 by a diaphragm 28 which is rigidly connected with the other end of the member 22. The regulating member 22, or the diaphragm 28, respectively, are indirectly controlled through an electromagnetic apparatus 31 which is located on an upper side 29 of the valve body 12; the drawing shows only a casing for the apparatus 31 with a passage extending therethrough, and fixing means therefor.

The diaphragm 28 comprises at its upper end an annular projection 32 with an enlarged end portion on its circumferential edge, the end portion, $X_4$ being held in conjugate contact, between adjacent sections of the body 12. The annular projection 32 may be either elastically deformable to such an extent that its deformation, caused by the displacement of the diaphragm 28 from its position of rest, is constant throughout the displacement, or the annular projection 32 may produce, during this movement within the zone shown by $X_5$, a snap effect which assists the movement of the diaphragm 28, acting approximately in the second half of this displacement. In a central zone, the diaphragm 28 is provided with a radial sealing lip 33 which enters into intimate sealing contact with corresponding wall sections of the multi-stepped control bore 23. In addition to this, the diaphragm 28 is provided with an axial annular sealing area 34, which rests against a first valve seat 36 in a transition zone between the venting bore 16 and an annular space 37 which leads into the consumer bore 18 wbhen the valve 11 is connected, a condition which is not shown in the drawing. The regulating member 22 is provided with a transverse bore 35 in the region of the annular space 37. A second valve seat 39 at the transition between this annular space 37 and a second annular space 38 is connected with a supply bore 14, one ring- or plate-shaped sealing lip 41 at one axial end of a double-seat sealing element 42 being in sealing contact with the seat 39 when the valve 11 assumes its position of rest as shown in the drawing.

The double-seat sealing element 42, which is designed as a ring gasket, comprises at its other axial end another ring- or plate-shaped sealing lip 43 which, relative to a transverse median plane through the element 42, constitutes a mirror image of the sealing lip 41. The two sealing lips 41 and 43 are separated by a groove 44 around the outer circumference of the ring gasket 42, the groove, in the unstrained state of the gasket 42, being approximately Vee-shaped, and the lips, because of the Vee-shaped groove 44, steadily decreasing in axial width towards their outer edges. In the unstrained state of the gasket 42 the parallel outer surfaces of the sealing lips 41, 43 extend at right angles to the longitudinal median axis, each having a small annular groove near the inner bore. The double-seat sealing element 42 is clamped between two discs 46 which are fixed to the regulating member 22 so that the element 42 is held immovably by the regulating member 22 both axially and radially. The sealing element 42 consists either of a plastic material with resilient properties or of rubber. The material of the sealing lips 41, 43, and their thickness are such that the sealing lips 41, 43 are elastically deformed when resting against corresponding valve seats 39, 47, the case where contact is made between the sealing lip 41 and the valve seat 39 being shown in the drawing. The diameter of the root of the circumferential groove 44 is considerably smaller than the second or third valve seat 39 or 47, respectively, with which it is associated. In this manner it has been achieved that the sealing lips 41, 43 are drawn, at least in part, into the opening inside the annular valve seat 39 or 47 respectively and that they therefore rest against the corresponding valve seats under pre-tension. The sealing effect of the lips in contact with the valve seat is intensified by the pressure admitted through the annular space 38. Independently of manufacturing tolerances and the clearances evolving during operation, it thus has been ensured that both sealing lips on the sealing element safely rest against the corresponding valve seats.

The third annular valve seat 47 extending into the second annular space 38 is defined by a projection which is integral with the casing and defines a third annular space 48 which is connected with the consumer bore 19. The regulating member 22 comprises, at the level of the third annular space 48, an enlarged section 49 with a plurality of axially continuous slots 51 distributed around its circumference. In the state of rest of the valve depicted in the drawing, compressed air admitted through the supply bore 14 therefore flows through the second annular space 38, the slots 51, and the third annular space 48 to the consumer bore 19, while the connection between the second annular space 38 and the second consumer bore 18 is cut off, the first sealing lip 41 and the second valve seat 39 being in sealing contact.

A fourth annular valve seat 52, provided at the lower end of the third annular space 48 at a position remote from the third valve seat 47, is in sealing contact with a ring gasket 53 when the valve 11 is in its position of rest. This gasket 53, like the sealing lip 41 at the second valve seat 39, is under the effect of the helical compression spring 27. The ring gasket 53 is sunk into a groove in an annular collar 54 supporting the regulating member 22 against the spring 27. The venting bore 17 opens into a fourth annular space 56 between the collar 54 and the wall of the control bore 23.

When the regulating member 22, which is shown in the state of rest, is caused to move downwards as indicated by the arrow D, airtight seals are established between the axial sealing surface 34 of the diaphragm 28 and the first valve seat 36, and between the second sealing lip 43 of the double-seat sealing element 42 and the third valve seat 47. The second sealing lip 43 may thereby be drawn into the opening of the annular valve seat 47, as is the sealing lip 41 in the valve seat 39 in the starting position, and the lip 41 is released from the valve seat 39. On completion of this movement, the ring gasket 53 has also been released from the fourth valve seat 52 so that a compressed air connection is established from the supply bore 14 through the annular spaces 38 and 37 or the transverse bore 35, respectively, to the consumer bore 18, while a venting connection is established between the consumer bore 19 and the venting bore 17 through the annular spaces 48 and 56 as indicated by the chain-dotted arrows. The sealing contact between the sealing elements and the corresponding valve seats is established in this state by the effect of a pressure induced by an operating element and it is maintained while this pressure is available, after which the regulating member 22 will be caused to return into its starting position under the load of the helical compression spring 27.

The operating element, i.e., the medium admitted through the supply bore 14, may be compressed air as in the illustrated example. The supply bore 14 is accordingly connected with a control chamber 67 located in the valve body 12, above the diaphragm 28, through an impulse line or channel 59. The impulse line 59 commences at a small bore 61 at the circumference of the supply bore 14 and, using channels or bores through the casing 12 (which are not shown in the drawing) leads to another bore 62 and a jet-shaped nozzle 63 which extends upwards coaxially with the longitudinal median axis of the valve so as to prevent unbalancing forces, opening into a coaxial blind bore 64 which is drilled into the body 12 from its upper side 29, opposite to the electromagnetic apparatus 31. Another channel 66 of the impulse line 59 which connects with the annular control chamber 67, opens into the base of the blind bore 64, eccentrically to the nozzle 63. The blind bore 64 accommodates an axially adjustable, piston shaped, sealing element 68, supporting it over an O-ring 70 which is in effective connection with the electromagnetic apparatus 31 which drives this element 68. In its position of rest, the piston 68 is maintained centrally and closely at the mouth of the nozzle 63, using for example a compression spring in the apparatus 31 for its control, thus preventing any pneumatic control impulse from being received at the control chamber 67 from the supply bore 14 through the impulse line 59. When the electromagnetic apparatus 31 is energized in order to reverse the system, the piston 68 is displaced upwards by an armature as indicated by the arrow C, lifting off the nozzle 63. As a result, compressed air is forced into the control chamber 67 from the supply bore 14 though channels which are not shown in the drawing, the nozzle 63, the space 69 between the base of the blind bore 64 and the piston 68, and through the channel 66 of the impulse line 59, so that the diaphragm 28, together with the regulating member 22, responding to the pneumatic pressure, moves downwards as indicated by the arrow D. When the magnet 31 is de-energized the piston 68 is once more pressed against the nozzle 63, and seals same. No pressure is therefore applied to the diaphragm 28, and the regulating member 22, responding to the effect of the helical compression spring 27, resumes its initial position.

A radial bore 72 opens into a recess 71 which is provided in the blind bore 64 on the side remote from the channel 66. This radial bore 72 extends to the outside and accommodates a pivotal bolt 73 which is supported in an O-ring in an axially fixed manner. An end section 74 of this bolt 73 projecting into the recess 71 is flattened to act as an eccentric. The flattened end section 74 fits into the recess 71 which has a circular bottom, the flattened portion preferably extending up to the longitudinal median plane. The plane, flat area of the end section 74 is thereby adjacent to the piston 68 when the system is in its state of rest. The piston 68 may be controlled by hand if, for example, the electromagnetic apparatus 31 breaks down and fails to move the piston 68, causing thereby failure of the entire valve 11. With the manual control, a screwdriver is passed through an operating slot, to reach the bolt 75 from the outside, turning it round so that the circular side of the flattened end section 74 is in contact with the piston 68 and therefore able to lift it up. As soon as the piston 68 is lifted out of its end position, compressed air may flow through the impulse line 59, and operate the valve 11 in the manner described above. It is evident that the operating and/or control medium need not be compressed air and that any gaseous or even liquid medium supplied under pressure may be used. In addition to this, different means may be applied for isolation of the impulse line 59, using for example an air-pulse operated flap or the like.

It follows from the above that the diaphragm 28 of the valve has a number of functions: it serves as a drive for the valve spindle which constitutes the regulating member 22, participating at the same time in the control of the regulating member in the bore 23 in the zone X6; it also has the function of an internal seal as indicated at X1, as it surrounds the regulating spindle as a seal from the outside; in the zone X2 the diaphragm serves as a setting area on axially effective poppet valve seat 36; and the diaphragm serves as a radially movable sealing lip between the regulating element and the control bore, the lips 33 being effective in the zone X3; and it has finally the usual functions of a restrained diaphragm.

In the chosen embodiment shown in the drawing the valve spindle is operated externally through an electromagnetic apparatus 31.

Finally, the diaphragm is provided with a stabilizing ring 60 which serves, as it were, as a supporting disc for the multi-functional diaphragm. This stabilizing ring may, for example, be an elastically resilient element consisting of metal which is located on the side adjacent to the impulse line and preferably vulcanized on to the diaphragm.

A multiway valve as hereinbefore described functions smoothly and is practically frictionless, is operable in numerous ways, and is based on a design as simple as possible so as to eliminate the danger of losses.

Known valves of similar type, which would be suitable for the envisaged functions, generally comprise a ring gasket serving as a double-seat seal which is axially adjustable between two stops. It is therefore possible for the gasket to assume a central position between its two end positions, jeopardizing the sealing function. Apart from this, it is necessary with these known valves to adhere to very narrow manufacturing tolerances allowed for the sealing element and the valve body in order to ensure that the sealing effect remains satisfactory.

The double-seat seal of the valve hereinbefore described retains its sealing properties even in the event of using valves and valve casings manufactured without the strict observance of the specified tolerances and/or preparing and mounting the gaskets and the valve seats with which they are assembled without observation of the respective tolerances, and wherein therefore relatively wide tolerance limits are acceptable without causing the danger of lowering the sealing standards.

The double-seat valve seal retains its sealing power even in those cases where the tolerances are wide. This is because the respective sealing lip will be axially deformed in the normal sealing position. This effect will be more or less pronounced depending on the given tolerance, or rather on the position of the sealing element relative to the corresponding valve seat, and the sealing lip will in any case be in intimate contact with the valve seat and extend into the annular valve seat more or less appreciably, depending on the force which pulled it into the seal. The circumferential groove not only guarantees that the sealing lip may be elastically deformed, but it also ensures that the sealing lip is pressed into the valve seat as soon as pressure is applied. The diameter, measured at the root of the groove, which is smaller than the diameter of the valve seat, makes the elastic deformation of the sealing lips simple.

Since all that is required for sealing is to provide a compressive load capable to overcome the pressure of the operating medium, the electromagnetic drive can be relatively small. However, it is also feasible to actuate the sealing element through an impulse given by the pressure medium used with the valve, or rather to initiate its movements through it. Operating or control media suitable for the valve include by preference compressed air, but any gaseous or liquid pressure medium can also be used.

Various modifications may be made without departing from the spirit of the invention.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A 5-way, 2-working position valve which includes:
   means forming an elongated valve body having a longitudinal central valve bore therein, said valve body also including five axially spaced tapped bores opening into said valve bore, said five tapped bores including two consumer bores, one pressure supply bore and two pressure venting bores, a first consumer bore and a first venting bore comprising a first pair of tapped bores, said first consumer bore and said one pressure supply bore comprising a second pair of tapped bores, said one pressure supply bore and the second consumer bore comprising a third pair of tapped bores, and said second consumer bore and the second venting bore comprising a fourth pair of tapped bores, said valve body also including means forming a first valve seat located between said first pair of said tapped bores, means forming a second valve seat located between said second pair of said tapped bores, means forming a third valve seat located between said third pair of said tapped bores, and means forming a fourth valve seat located between said fourth pair of said tapped bores, said second and third valve seats being axially separated along the longitudinal dimension of said central bore a predetermined distance;

means forming an axially adjustable regulating member positioned for movement along the longitudinal dimension of said central bore from a first working position to a second working position;

means forming a single diaphragm sealingly attached to a first end of said regulating member, said diaphragm including a portion forming an elastically deformable annular radial flex portion which is fixedly positioned in contact with said valve body so as to suspend said diaphragm in said valve bore and which defines a chamber between said first end of said regulating member and said valve body, and a portion which forms both an elastically deformable annular axial projection having a sealing lip extending radially so as to slidingly contact said valve bore and a radial end face, said end face of said single diaphragm being engageable with the means forming said first valve seat when said regulating member is in its second working position to prevent fluid communication between said first pair of said tapped bores;

means forming a further seal member attached near the second end of said regulating member, said seal member having a radial end face engageable with said means forming the fourth valve seat to prevent fluid communication between said fourth pair of said tapped bores when said regulating member is in its first working position;

a Vee-shaped double-seat sealing member attached to said regulating member at point separated from said annular axial projection portion of said single diaphragm and between said second and third valve seat-forming means, said double seat sealing member comprising a ring gasket having sealing lips around its radial outer periphery extending from a root portion, the sealing lips being elastically deformable in the directions of axial movement of the regulating member;

said Vee-shaped double-seat sealing member having an axial length equal to about said predetermined distance between said second and third valve seat-forming means so that said sealing lips will be capable of simultaneously contacting both said means forming said second valve seat and said means forming said third valve seat when said regulating member is between said first and second working positions, the respective lips of said sealing member contacting respective second or third valve seat-forming means and thus alternatively preventing fluid communication between said second pair of tapped bores or said third pair of tapped bores when said regulating member is respectively in its first and second working positions; and spring means positioned between said second end of said regulating member and said valve body for biasing said regulating member into its first working position, said second working position being established against the biasing of said spring by pressure medium flowing into said chamber between said first end of said regulating member and said valve body.

2. The valve according to claim 1 wherein said means for controlling the axial placement of said regulating member includes means to supply an operating medium through said valve body to a space in said central bore between said valve body and said diaphragm, said space being between said valve body and an axial surface of the diaphragm, said means for supplying operating medium including a supply channel opening eccentrically into the space.

3. The valve according to claim 2 wherein said means for supplying operating medium to said space includes means in said valve body forming a jet-shaped nozzle which communicates with a source of operating medium, means forming a blind hole in said valve body into which the supply channel communicates, and an adjustable positionable sealing member movable to allow or prevent fluid communication between said jet-shaped nozzle and said blind hole.

4. The valve according to claim 3 including means connected to said sealing member to move same.

5. The valve according to claim 4 wherein said axial surface of said diaphragm which in part form said space includes a stabilizing ring which is vulcanized to said diaphragm.

6. The valve according to claim 5 wherein said means to move said sealing member includes a radial bore in said valve body which opens into said blind hole, a bolt adjustably positioned in said blind hole, said bolt having an eccentric end which is engagable with said sealing member such that manual turning of said bolt will cause movement of said sealing member.

7. The valve according to claim 5 wherein sid means to move said sealing member comprises a electromagnet connected thereto.

8. The valve according to claim 1 wherein said first pair of tapped bores are positioned on opposite sides of said valve body.

9. The valve according to claim 1 wherein said third valve seat is formed by a portion of said valve body projecting into said valve bore so as to form an end section having a cylindrical face in the longitudinal direction of said valve bore.

10. The valve according to claim 9 wherein said portion of said valve body projecting into said valve body includes a hollow section supporting said end section which has a larger radial dimension than said end section.

11. The valve according to claim 1 wherein the sealing lip of the Vee-shaped double-seat sealing member located closest to said third valve seat has a constantly decreasing axial width with increasing distance from said root portion.

12. The valve according to claim 1 wherein said Vee-shaped double-seat sealing member is a one piece elastomeric member.

13. The valve according to claim 1 wherein said regulating member includes spaced apart discs which fixedly hold the Vee-shaped double-seat sealing member in position with respect to said regulating member.

14. The valve according to claim 1 wherein the root portion of said Vee-shaped double-seat sealing member has a smaller radial dimension than the radial distance defined between the first valve seat and the central axis of the valve bore or the second valve seat and the central axis of the valve bore.

* * * * *